Inventor
George W. Carlson
By Christy, Parmelee, & Strickland
Attorneys

Patented May 19, 1953

2,639,139

UNITED STATES PATENT OFFICE 2,639,139

SPRING BIASED ACTUATOR

George W. Carlson, Wayne, Mich., assignor to Robotyper Corporation, Detroit, Mich., a corporation of Michigan Application September 23, 1948, Serial No. 50,746

4 Claims. (Cl. 267—1)

This invention relates to a spring biased actuator for relays such as valves and the like, and more particularly, to an improved arrangement of mechanism for mounting an operating member on a support and for resiliently biasing its movement thereon.

The use of relays for remotely controlling the operation of machinery and apparatus is well known. Such relays commonly comprise a valve or an electrical contactor, depending on whether the apparatus controlled thereby is electrically or fluid pressure operated, and are usually provided with an operating member having a bias for movement to or from an operating position for controlling the operation of the valve or contactor. The mechanism for mounting and biasing the operating member usually consists of several parts which are difficult and expense to assemble and repair.

One of the principal objects of this invention is to provide an improved arrangement of mechanism for mounting and biasing the movement of a relay operating member or actuator in which the required number of operating parts is reduced to a minimum and which may be assembled with little effort and expense.

A further object of this invention is to provide a single element which is operative both to mount and to bias an operating member or actuator for a relay.

Generally speaking, the above and related objects of the invention are accomplished by the provision of a single leaf spring which is constructed in such manner that it is operable to both mount the operating member in position and to bias its movement on a support. The spring is constructed by bending a flat strip of spring steel into two integral parts of unequal length which are inclined angularly relative to each other. The shorter part is provided with an opening by which it may be mounted on a pin with the longer part yieldably engaging with the operating member to resiliently bias its movement. The movement of the operating member is confined to a single plane by the pin on which the spring is mounted and by a second pin spaced from the mounting pin, the operating member having spaced openings through which the pins extend for guiding its movement. The shorter spring part has its free end engaged with an end of the operating member so that movement of the operating member is further confined to a pivotal movement about its end. The longer spring part is flexible relative to the shorter part and has its free end engaged with the operating member at a point spaced from the mounting pin and is thus operable to resiliently bias the pivotal movement of the operating member. The structure is assembled by the simple operation of securing the shorter spring part on the mounting pin and may be readily taken apart by the reverse of this operation.

Other objects and advantages of this invention will become apparent from the following description.

In the drawing, there is shown a preferred embodiment of the invention. In this showing:

Figure 1:
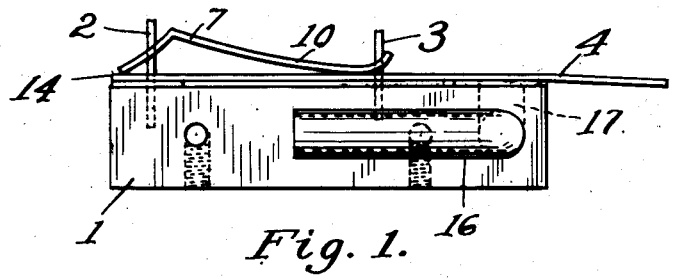
Fig. 1 is a side elevational view of a relay valve having operating mechanism constructed in accordance with the principles of this invention.

In the various figures of the drawing, the numeral 1 designates a support having a pair of parallel pins 2 and 3 projecting outwardly therefrom. An operating member comprising a flat strip 4 is mounted on the top surface of the support and is provided with a pair of openings 5 and 6 therein through which the pins 2 and 3, respectively, extend. The opening 5 has a loose fit on the pin 2 and the opening 6 is elongated or a slot for a purpose to be described. The pins 2 and 3 have their axes located in a common plane and are operable to guide the movement of the operating member 4 and to confine it to movement in such plane.

To secure the operating member 4 in a position on the support 1 and to provide a resilient bias thereto, there is provided a mounting element indicated as a whole by the numeral 7. The element 7 is formed from a strip of spring steel and is bent as at 8 to provide parts 9 and 10 of unequal length which extend angularly relative to each other as shown in the drawings. The shorter part 9 is provided with an opening 11 having a diameter slightly larger than that of the pin 2. To mount the element 7 in position, the end 12 of the part 10 is placed in engagement with the member 4 at a point adjacent the pin 3 and pressure is applied to the part 10 which is flexed until the part 9 occupies a position substantially normal to the pin 2. This action is necessary in order that the pin 2 may be entered through the opening 11. After the pin 2 is inserted through the opening 11, downward pressure is applied to the part 9 to force it downwardly on the pin 2 until its lower edge 13 contacts the member 4 adjacent its end 14. When pressure is released, the member 7 will spring to the position shown in Figs. 1 and 3 and will be securely held in such position. In such position, it will be noted that the short spring part 9 extends angularly relative to the pin 2 and the edges of the opening 11 will bind tightly against the sides of the post 2. This binding action is responsible for the curvature of the part 9 as viewed in Figs. 1 and 3. To remove the the member 7, it is necessary to pry upwardly on the edge 13 and press downwardly on the center portion of the part 10 to position the short part 9 at substantially a right angle to the pin 2 and thus move the edges of the opening 11 out of engagement with the pin 2. This action releases the short part 9 which may then be withdrawn upwardly with respect to the pin 2.

When the member 7 is mounted on the pin 2 as described above, its end 13 will hold the end 14 of the operating member 4 against the support 1. Movement of the member 4 is thus limited to pivotal movement about its end 14 in a plane common to the pins 2 and 3. To permit this movement the opening 5 is enlarged to provide a loose fit on the pin 2 and the opening 6 is elongated. The end 12 of the part 10 provides a resilient bias in a clockwise direction against the part 4. The part 10 is flexible and will yield to allow pivotal movement of the part 4 in a counter-clockwise direction about its end 14. The resilient bias against the operating member 4 may be readily increased by employing two or more spring elements 7. In such case, the spring elements 7 are mounted in superimposed position on the pin 2. The end 12 is provided with a slot 15 in which the pin 3 is receivable to prevent the spring 7 from rotating about the pin 2.

Figure 2:
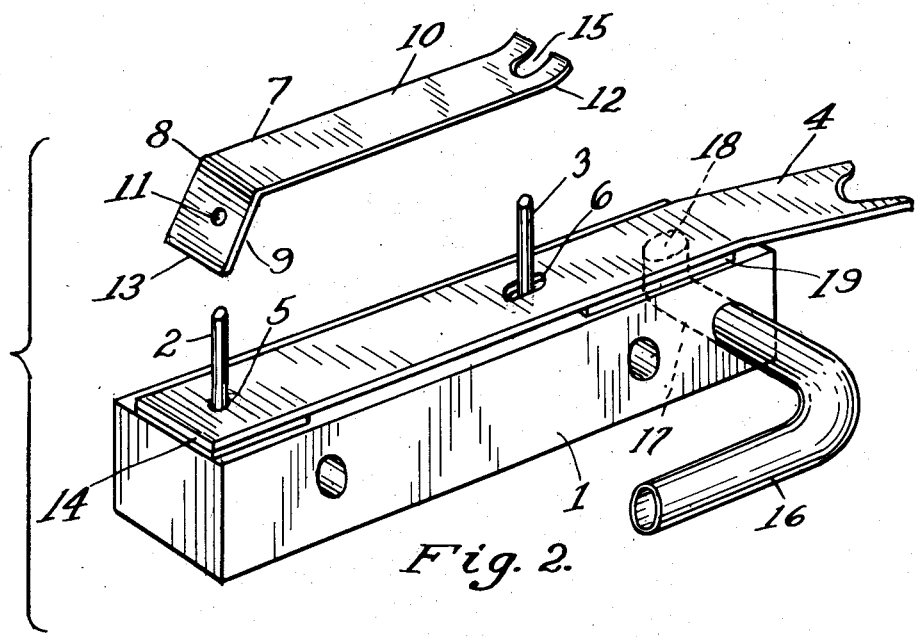
Fig. 2 is an enlarged exploded perspective view of the structure shown in Fig. 1.

The structure thus far described provides a pivotal biasing mount for the member 4 which is readily adaptable for use in a relay. Figs. 1 and 2 illustrate the application of the member 4 as the operating member for a fluid pressure valve controlling the operation, for example, of a vacuum suspended piston or apparatus (not shown). In this showing, the support 1 comprises a valve body provided with a conduit 16 which is connected to a source of below atmospheric pressure, such as a cylinder having a piston suspended therein by vacuum. The conduit 16 is connected with a passage 17 in the support 1 having an opening or port 18 on the top surface of the support 1. When the member 4 is in its normal position as shown in Figs. 1 and 2, the port 18 is closed by a pad 19 of leather or other suitable material secured to the underside of the operating member 4. In such position, the pad 19 is effective to disconnect the conduit from the atmosphere. Upon rotation of the operating member 4 in a counter-clockwise direction against the bias of the spring 10, the pad 19 will uncover the port 18 to connect the conduit 16 to the atmosphere. Air will then flow through the conduit 16 to operate apparatus (not shown) to which it is connected.

Figure 3:
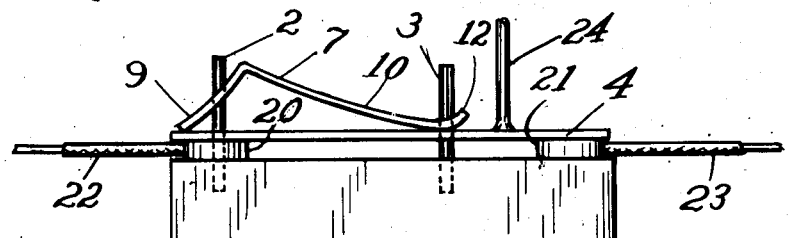
Fig. 3 is a view similar to Fig. 1 illustrating the application of the invention to an electrical contactor relay.

In Fig. 3, there is shown an application of the invention to an electrical relay. In this showing the support 1 is provided with a pair of stationary contacts 20 and 21 respectively connected with a pair of insulated conductors 22 and 23. The operating member 4 is formed of conducting material and is mounted on the contacts 20 and 21 as described above in connection with the support 1. In its normal position as shown in Fig. 3, the member 4 will function as an electrical bridge connecting the contacts 20 and 21 to complete an electrical circuit through the conductors 22 and 23 and electrical apparatus (not shown) to which they may be connected. This electrical circuit will be broken to effect operation of the apparatus to which it is connected upon movement of the member 4 in a counter-clockwise direction against the bias of the spring 10 which action will move the member 4 out of bridging engagement with the contact 21. An actuating member 24 is connected to the member 4 for operating the same.

From the foregoing, it will be apparent that there is provided an exceedingly simple arrangement of operating mechanism for controlling the operation of a relay. Attention is particularly directed to the fact that the single member 7 is effective to both secure the operating member 4 in position on a support and to provide a resilient bias for its movement relative to the support. In addition, it will be noted that the member 7 is the only movable member required to assemble and disassemble the relay operating mechanism. It will thus be seen that the simplicity of the structure affords desirable features with respect to the cost of its construction and assembly.

Although I have illustrated and described only a preferred form of the invention and a modification, it will be recognized that changes in the details and arrangement disclosed may be made without departing from the spirit of the invention of the scope of the appended claims.

I claim:

1. In an actuator, a support, an operating member comprising a flat strip adapted to normally lie flat on said support, and having an opening adjacent an end thereof and an elongated slot positioned inwardly from said opening, a pair of pins projecting upwardly from said support and extending through said opening and slot, respectively, for positioning said strip on said support, and a strip of spring steel formed of two parts extending angularly relative to each other, one of said parts being relatively short and having an opening slightly larger than and receiving the pin extending through said operating strip opening to mount said spring strip on said support with the end of said short part engaged with the end of said operating strip adjacent the opening therein, the other of said parts being relatively long and in resilient engagement with said operating strip adjacent said elongated slot when said shorter part is mounted on said pin, said other part being resiliently yieldable to allow pivotal movement of said operating strip about an axis extending transversely thereof and adjacent said end, said pins and spring being operative to restrain said operating strip against movement about axes other than said pivotal axis.

2. In an actuator, a support, an operating member movable relative to said support, a pair of mounting pins having parallel axes located in a common plane, said member having openings through which said pins extend for restraining said member against movement other than in said common plane, and a leaf spring having two parts of unequal length angularly inclined to each other, one of said parts being relatively short and having an opening therein slightly larger than and receiving one of said pins to mount said spring with the free end of said one part engaged with one end of said operating member to confine movement of said operating member to a pivotal movement about its said one end, the other of said parts being relatively long and being engaged with said operating member adjacent the other of said pins for resiliently biasing its pivotal movement in said common plane.

3. A resilient biasing device comprising a leaf spring having two parts extending angularly relative to each other, a support having a pin projecting outwardly therefrom, one of said parts having intermediate its ends an opening slightly larger than and receiving said pin, and a member with which the other of said parts is yieldably engaged and against which it applies a resilient biasing force, the reaction of said biasing force on said spring moving its said one part to an angular position on said pin with opposite edges of the opening therein in holding engagement with said pin.

4. A resilient biasing device comprising a leaf spring having two parts of unequal length extending angularly relative to each other, the shorter of said parts having an opening therein intermediate its ends, a support having a pin projecting outwardly therefrom and extending through said opening, said opening being slightly larger than said pin, and a member in yielding engagement with the free end of the longer of said spring parts and against which it exerts a resilient biasing force, the reaction of said biasing force holding said shorter part in an angularly inclined position relative to said pin and with opposite edges of the opening therein in binding engagement with said pin.

GEORGE W. CARLSON.

References Cited in the file of this patent

UNITED STATES PATENTS

| Number | Name | Date |
|---|---|---|
| 502,750 | O'Neill | Aug. 8, 1893 |
| 1,125,946 | Bovie | Jan. 26, 1915 |
| 1,166,589 | Holmes | Jan. 4, 1916 |
| 1,495,998 | Gilchrist et al. | June 3, 1924 |
| 2,372,938 | Doeg | Apr. 3, 1945 |
| 2,434,734 | Buschmann | Jan. 20, 1948 |